Figure 1:
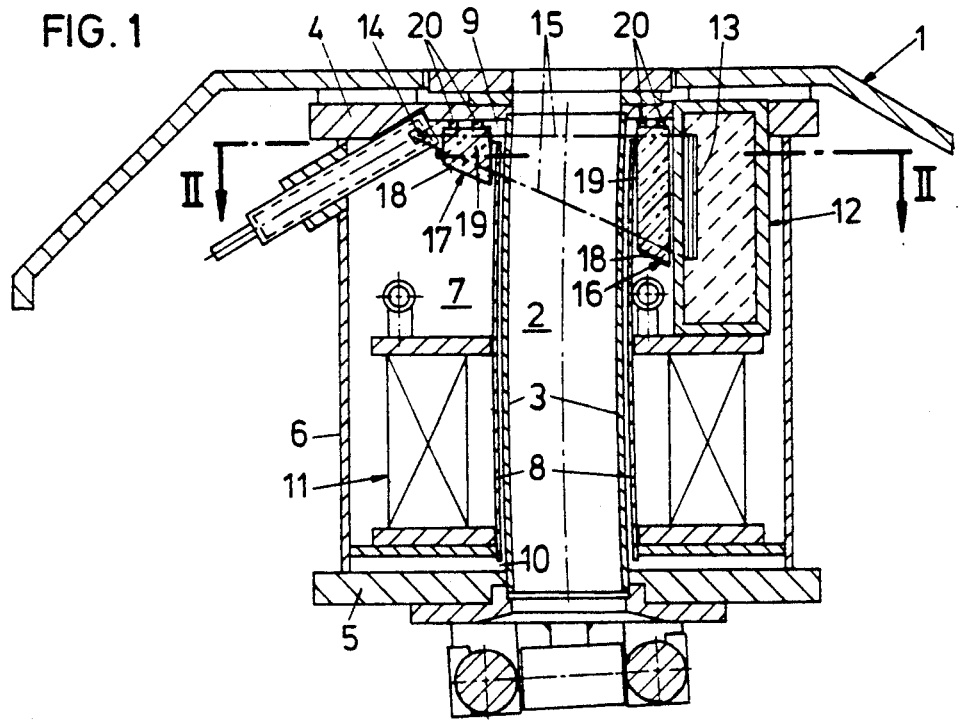

United States Patent [19]

Schilcher

[11] Patent Number: 5,072,774
[45] Date of Patent: Dec. 17, 1991

[54] CONTINUOUS CASTING MOLD ARRANGEMENT

[75] Inventor: Klaus Schilcher, Linz, Austria

[73] Assignee: Voest-Alpine Industrieanlagenbau G.m.b.H., Linz, Austria

[21] Appl. No.: 621,030

[22] Filed: Nov. 30, 1990

[30] Foreign Application Priority Data

Dec. 4, 1989 [AT] Austria .................................. 2758/89

[51] Int. Cl.[5] ............................................ B22D 11/18
[52] U.S. Cl. .................................... 164/150; 164/449
[58] Field of Search .......................... 164/449, 453, 150

[56] References Cited

FOREIGN PATENT DOCUMENTS 63072 10/1982 European Pat. Off. ............ 164/150
2716271 10/1977 Fed. Rep. of Germany .

Primary Examiner—Kuang Y. Lin
Attorney, Agent, or Firm—Hopgood, Calimafde, Kalil, Blaustein & Judlowe

[57] ABSTRACT

There is disclosed a continuous casting mold including side walls defining a mold cavity and a cooling shell surrounding the side walls. A coolant cavity is formed between the side walls and the cooling shell for a coolant to pass therethrough. A level measuring means constituted by a radiation source disposed in the upper region of the continuous casting mold lateral of the mold cavity and by a beam detector also arranged in the upper region of the continuous casting mold and lateral of the mold cavity serves to determine the filling level of the mold. In order to avoid the absorption of the radiation from the radiation source by the coolant, at least one coolant displacer is arranged in the region of the beam path passing the coolant cavity.

12 Claims, 2 Drawing Sheets

CONTINUOUS CASTING MOLD ARRANGEMENT

The invention relates to a continuous casting mold, in particular a continuous steel casting mold, comprising side walls defining a mold cavity and a cooling shell surrounding the side walls, a coolant cavity being formed between the side walls and the cooling shell for a coolant to pass therethrough, and a level measuring means constituted by a radiation source disposed in the upper region of the continuous casting mold lateral of the mold cavity and a beam detector also arranged in the upper region of the continuous casting mold and lateral of the mold cavity.

A continuous casting mold of this type is known from DE-B 27 16 271. There, the radiation source, which occupies a large volume, is provided at a distance from the side wall delimiting the mold cavity in order not to impede the coolant flow along this side wall. Due to the coolant streaming between the radiation source and the neighboring side wall of the continuous casting mold, the radiation source is screened to the major extent such that a relatively strong radiation emitter must be installed in order to obtain perfect measuring results.

This problem will be considerably intensified if the radiation emitter is arranged outside of the cooling shell because of an electromagnetic agitating means provided within the coolant cavity, since, as a result, the distance between the radiation source and the radiation detector will have become further increased to a considerable extent and the beams have to travel a relatively long way through the screening-effect provoking coolant.

It is the object of the invention to provide a continuous casting mold of the initially defined kind, which will do with a relatively small radiation source, thus involving a very low radiation load on the casting personnel.

In accordance with the invention, this object is achieved in that at least one coolant displacer is arranged in the region of the beam path passing the coolant cavity. It suffices to dimension this coolant displacer in accordance with the beam path such that it need only be very narrow and, therefore, may extend almost immediately to the side wall delimiting the mold cavity without impeding the coolant flow. Thereby, the uniform cooling of the mold in the accordingly sensitive region of the casting level of the mold is ensured.

Preferably, a coolant displacer is arranged between the radiation source and the side wall of the mold cavity and an additional coolant displacer is arranged between the beam detector and the side wall of the mold cavity. In this manner, particularly weak radiation sources will do.

Suitably, the coolant displacer has a specific weight lower than that of the coolant such that the coolant displacer does not exhibit nearly any screening effect at all.

Preferably, the coolant displacer has a compressive strength corresponding to the coolant circulation and is designed to be coolant-tight.

A preferred embodiment is characterized in that the coolant displacer is constituted of pressure-proof foam glass and of a coolant-tight jacket surrounding the foam glass. Foam glass has a slight specific weight and is not only highly pressure-proof, but also corrosion-resistant, steam and gas-tight, and consequently cannot absorb any liquids, thus being excellently suited as a material for the coolant displacer.

A further preferred embodiment is characterized in that the coolant displacer is made of concrete perlite. Concrete perlite also has a slight specific weight, is durable for an unlimited period and is impermeable to water.

Suitably, the coolant displacer comprises a fiber-reinforced synthetic polyester envelope.

According to another preferred embodiment, the coolant displacer is formed by a coolant-tight container filled with gas, the gas filling of the coolant displacer suitably being adaptable to the pressure of the coolant circulation.

Advantageously, a jacket of the coolant displacer is made of stainless steel plate or sheet.

Since the coolant displacer only has a very small cross section, the cooling shell, in the region of the coolant displacer, may have a wall thickness that is reduced with respect to the remaining regions.

Figure 2:
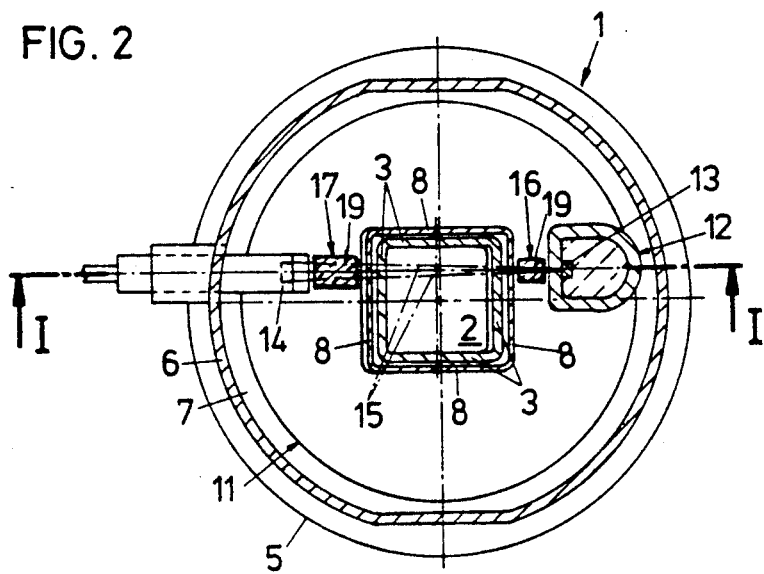
Figure 3:
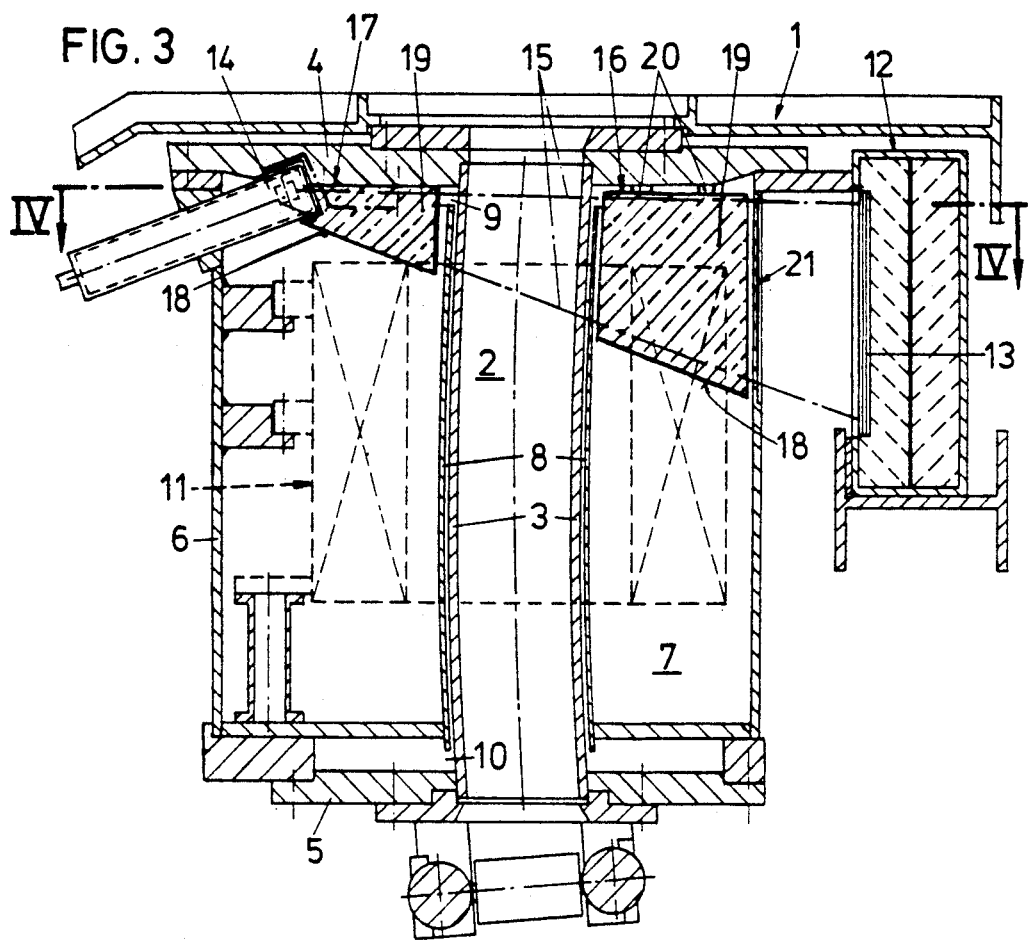
Figure 4:
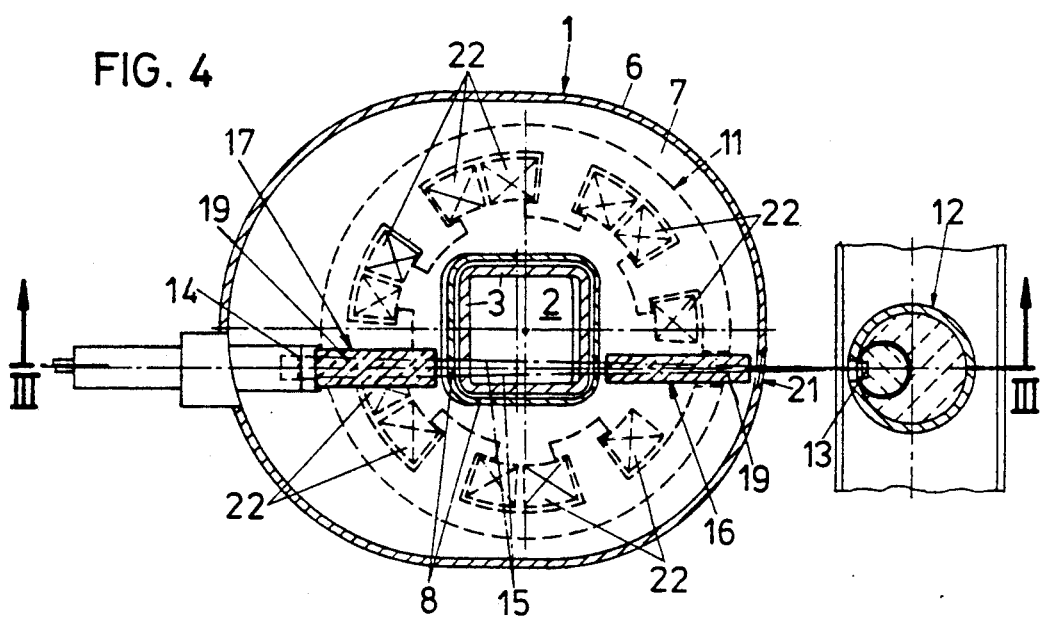

In the following, the invention will be explained in more detail by way of two exemplary embodiments and with reference to the accompanying drawings, wherein:

FIG. 1 illustrates a schematic section through a continuous casting mold according to a first embodiment led parallel to the plane of the mold axis along line I—I of FIG. 2;

FIG. 2 also is a schematic sectional view along line II—II of FIG. 1; FIG. 3 is an illustration analogous to FIG. 1, depicting a further embodiment of a continuous casting mold; and FIG. 4 is a section analogous to FIG. 2 led along lines IV—IV of FIG. 3.

As is apparent from FIG. 1, a continuous casting mold 1, which is destined for casting a steel strand having billet or bloom cross section, has an approximately square mold cavity 2 delimited by side walls 3. The side walls 3 are tightly connected with front plates 4, 5 in the upper and lower regions of the mold. A cooling shell 6, which tightly connects the external peripheries of the two front plates 4, 5, defines a coolant cavity 7 between itself, the side walls 3 as well as the front plates 4, 5, through which a coolant, such as water, passes.

In order to ensure a defined flow of the coolant stream on the side walls 3 of the continuous casting mold 1, the mold is equipped with baffle walls 8 at a slight distance from the side walls 3, which extend parallel to the side walls 3 and leave an annular gap 9, 10 relative to the upper and lower front plates 4, 5, respectively, such that the coolant is forced to flow along the side walls 3.

The coolant cavity 7 is dimensioned such that an electromagnetic agitating means 11 may be accommodated in its interior. It will be arranged in the lower region of the continuous casting mold 1. In the upper region of the continuous casting mold 1, a radiation source 12 is installed in the interior of the coolant cavity 7, comprising a radioactive rod radiator 13. Opposite to this radiation source 12, there is arranged a beam detector 14, such as a counting tube, also lying within the coolant cavity 7. The radiation source 12 and the beam detector 14 constitute a level measuring means for determining the height of the casting level.

In order to prevent the radioactive beams from being screened or attenuated by the coolant streaming within the coolant cavity 7, a narrow coolant displacer 16, 17 is inserted in the region of the beam path of the radioactive radiation indicated by lines 15 between the baffle wall 8 and the radiation source 12 as well as in the region between the baffle wall 8 and the radiation detector 14, each having its shape adapted to the geometric shape of the beam path and, thus, being wedgeshaped. These coolant displacers 16, 17 have very low volume weights; they are formed by waterproof jackets 18 filled with foam glass 19. The waterproof jacket 18 is, for instance, made of stainless steel sheet. The jacket 18 may have very thin walls, because the foam glass 19 is sufficiently pressure-proof to resist the pressure of the coolant.

The jackets 18 of the coolant displacers 16, 17 also might be filled with gas, wherein, however, either the gas filling is under a pressure that corresponds to that of the coolant or the jacket of the coolant displacer has a slightly larger wall thickness so as to resist the pressure of the coolant in the absence of a compressed gas filling. In the latter case, in particular the large-surface and vertically directed side walls of the coolant displacers 16, 17 are designed to be thicker; this, however, does not affect the undesired screening of the radioactive radiation, since they are located laterally outside of the region 15 of the beam path of the radioactive radiation, that is relevant to the measurement of the casting level.

What is important is that the coolant displacers 16, 17 only have slight specific weights in the regions in which they are passed by the beams, because the size of the radiation source will depend thereon.

Suitably, the coolant displacers 16, 17 are equipped with retaining means 20 provided on the jacket 18 and fastenable to a wall of the continuous casting mold, in particular to its upper front wall 4.

According to the embodiment illustrated in FIGS. 3 and 4, the radiation source 12 is located outside of the coolant cavity 7, which results in a particularly long path of the radioactive radiation through the coolant cavity 7. As is apparent from FIG. 3, the coolant displacer 16, in this case, extends from the external cooling shell 6 of the continuous casting mold 1 to near the baffle wall 8 such that an attenuation of the radioactive radiation by the coolant is effectively prevented.

In the region 21, in which the cooling shell 6 borders at the coolant displacer 16, the cooling shell 6 is particularly thin-walled such that an attenuation of the radioactive radiation because of the cooling shell 6 likewise can be kept very low.

An electromagnetic agitating means 11 is denoted by broken lines in FIGS. 3 and 4, its agitator coils 22 suitably being arranged slightly asymmetrical about the periphery of the side walls 3 of the continuous casting mold 1, as is apparent from FIG. 4, in order not to impede the passage of the radioactive radiation.

The coolant displacers can be employed not only with molds for billets or blooms, but also with molds for casting a strand having slab cross section, irrespective of whether an electromagnetic agitating means is provided in the mold region or not.

What I claim is:

1. In a continuous casting mold arrangement, such as a continuous steel casting mold arrangement, of the type including a continuous casting mold, mold side wall means defining a mold cavity, a cooling shell surrounding said mold side wall means and delimiting a coolant cavity together with said mold side wall means for a coolant to pass therethrough, and a level measuring means, said level measuring means being constituted by a radiation source disposed in the upper region of said continuous casting mold lateral of said mold cavity and adapted to emit beams following a beam path and by a beam detector also arranged in the upper region of said continuous casting mold and lateral of said mold cavity, the improvement comprising at least one coolant displacer means provided in said coolant cavity in a region passed by said beam path.

2. A continuous casting mold arrangement as set forth in claim 1, wherein said coolant displacer means comprises a first coolant displacer arranged between said radiation source and said mold side wall means and a second coolant displacer arranged between said beam detector and said mold side wall means.

3. A continuous casting mold arrangement as set forth in claim 1, wherein said coolant displacer means has a specific weight smaller than that of said coolant.

4. A continuous casting mold arrangement as set forth in claim 1, wherein said coolant is guided in a coolant circulatory system and said coolant displacer means has a compressive strength corresponding to that of said coolant circulatory system.

5. A continuous casting mold arrangement as set forth in claim 1, wherein said coolant displacer means is designed to be coolant-tight.

6. A continuous casting mold arrangement as set forth in claim 1, wherein said coolant displacer means is constituted of pressure-proof foam glass and of a coolant-tight jacket surrounding said foam glass.

7. A continuous casting mold arrangement as set forth in claim 1, wherein said coolant displacer means is made of concrete perlite.

8. A continuous casting mold arrangement as set forth in claim 1, wherein said coolant displacer means comprises a fiber-reinforced synthetic polyester envelope.

9. A continuous casting mold arrangement as set forth in claim 1, wherein said coolant displacer means is formed by a coolant-tight container containing a gas filling.

10. A continuous casting mold arrangement as set forth in claim 9, wherein said coolant is guided in a coolant circulatory system and said gas filling is adaptable to the pressure of said coolant circulatory system.

11. A continuous casting mold arrangement as set forth in claim 1, wherein said coolant displacer means includes a jacket made of stainless steel sheet or plate.

12. A continuous casting mold arrangement as set forth in claim 1, wherein said cooling shell, in the region of said coolant displacer means, has a wall thickness reduced with respect to the remaining regions.

* * * * *